US011996055B2

(12) United States Patent
Dong et al.

(10) Patent No.: US 11,996,055 B2
(45) Date of Patent: May 28, 2024

(54) DISPLAY PANEL HAVING A TIME-DIVISION MULTIPLEXING CIRCUIT AND METHOD OF DRIVING THEREOF

(71) Applicant: BOE TECHNOLOGY GROUP CO., LTD., Beijing (CN)

(72) Inventors: Tian Dong, Beijing (CN); Bo Wang, Beijing (CN); Jingquan Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/794,400

(22) PCT Filed: Jun. 21, 2021

(86) PCT No.: PCT/CN2021/101259
§ 371 (c)(1),
(2) Date: Jul. 21, 2022

(87) PCT Pub. No.: WO2021/259204
PCT Pub. Date: Dec. 30, 2021

(65) Prior Publication Data

US 2023/0050569 A1 Feb. 16, 2023

(30) Foreign Application Priority Data

Jun. 24, 2020 (CN) ........................ 202010592404.X

(51) Int. Cl.
*G09G 3/3275* (2016.01)

(52) U.S. Cl.
CPC ... *G09G 3/3275* (2013.01); *G09G 2310/0297* (2013.01); *G09G 2310/08* (2013.01)

(58) Field of Classification Search
CPC .................................................... G09G 3/3275
(Continued)

(56) References Cited

U.S. PATENT DOCUMENTS

2006/0109227 A1 5/2006 Park
2009/0225009 A1* 9/2009 Ka ....................... G09G 3/3233 345/76
(Continued)

FOREIGN PATENT DOCUMENTS

CN 103065556 A 4/2013
CN 104656295 A 5/2015
(Continued)

OTHER PUBLICATIONS

First Office Action for Chinese Patent Application No. 202010592404.X issued by the Chinese Patent Office on Feb. 7, 2021.
(Continued)

*Primary Examiner* — Long D Pham
(74) *Attorney, Agent, or Firm* — IP & T GROUP LLP

(57) ABSTRACT

A display panel includes a sub-pixel array, gate lines, first data lines, second data lines, a pixel control circuit and a time-division multiplexing circuit. The sub-pixel array includes a plurality of sub-pixels arranged in rows and columns. Sub-pixels in a same row are coupled to the pixel control circuit through at least one gate line. Sub-pixels located in odd-numbered rows in sub-pixels in a same column are coupled to a first data line, and sub-pixels located in even-numbered rows in the sub-pixels in the same column are coupled to a second data line. The time-division multiplexing circuit is coupled to the plurality of first data lines, the plurality of second data lines, and a data signal terminal. The time-division multiplexing circuit is configured to electrically connect the data signal terminal to the first data lines and the second data lines in a time-division manner.

11 Claims, 6 Drawing Sheets

(58) Field of Classification Search
USPC .......................................................... 345/204
See application file for complete search history.

(56) References Cited

U.S. PATENT DOCUMENTS

| | | | |
|---|---|---|---|
| 2010/0001937 | A1 | 1/2010 | Yen |
| 2014/0111406 | A1 | 4/2014 | Wang et al. |
| 2015/0002379 | A1* | 1/2015 | Kim .................... G09G 3/3233 345/82 |
| 2015/0061983 | A1 | 3/2015 | Kim |
| 2016/0189600 | A1 | 6/2016 | Shin et al. |
| 2017/0039928 | A1 | 2/2017 | Zhang et al. |
| 2018/0174533 | A1 | 6/2018 | An |
| 2019/0228726 | A1 | 7/2019 | Ono et al. |
| 2020/0013331 | A1 | 1/2020 | Kobayashi |
| 2020/0051491 | A1 | 2/2020 | Xuan et al. |
| 2020/0410939 | A1 | 12/2020 | Li et al. |
| 2021/0134202 | A1 | 5/2021 | Zhang et al. |
| 2021/0327360 | A1 | 10/2021 | Dong |
| 2022/0189378 | A1 | 6/2022 | Dong |
| 2022/0327974 | A1 | 10/2022 | Dong et al. |

FOREIGN PATENT DOCUMENTS

| | | | |
|---|---|---|---|
| CN | 105741735 | A | 7/2016 |
| CN | 105957484 | A | 9/2016 |
| CN | 107610640 | A | 1/2018 |
| CN | 108182915 | A | 6/2018 |
| CN | 109410885 | A | 3/2019 |
| CN | 110148384 | A | 8/2019 |
| CN | 110517636 | A | 11/2019 |
| CN | 110619840 | A | 12/2019 |
| CN | 110827765 | A | 2/2020 |
| CN | 111223463 | A | 6/2020 |
| CN | 111243441 | A | 6/2020 |
| CN | 111292665 | A | 6/2020 |
| CN | 111627393 | A | 9/2020 |
| KR | 10-2015-0037303 | A | 4/2015 |
| WO | 2019053834 | A1 | 3/2019 |

OTHER PUBLICATIONS

Second Office Action for Chinese Patent Application No. 202010592404.X Issued by the Chinese Patent Office on Oct. 27, 2021.

* cited by examiner

DISPLAY PANEL HAVING A TIME-DIVISION MULTIPLEXING CIRCUIT AND METHOD OF DRIVING THEREOF

CROSS-REFERENCE TO RELATED APPLICATIONS

This application is a national phase entry under 35 USC 371 of International Patent Application No. PCT/CN2021/101259, filed on Jun. 21, 2021, which claims priority to Chinese Patent Application No. 202010592404.X, filed on Jun. 24, 2020, which are incorporated herein by reference in their entirety.

TECHNICAL FIELD

The present disclosure relates to the field of display technologies, and in particular, to a display panel, a method for driving the same, and a display device.

BACKGROUND

Virtual Reality (VR) display has brought a brand-new visual experience to people, and has won the attention and favor of more and more people. In the meantime, mobile games have gradually become an important form of entertainment for users. Existing display panels can be used to realize VR display and game screen display. Generally, both VR display and gaming modes require a high refresh rate of the display panel.

SUMMARY

In one aspect, a display panel is provided. The display panel includes: a sub-pixel array, a plurality of gate lines, a plurality of first data lines, a plurality of second data lines, a pixel control circuit and a time-division multiplexing circuit. The sub-pixel array includes a plurality of sub-pixels arranged in a plurality of rows and a plurality of columns. Sub-pixels in a same row are coupled to the pixel control circuit through at least one gate line. Sub-pixels located in odd-numbered rows in sub-pixels in a same column are coupled to a first data line, and sub-pixels located in even-numbered rows in the sub-pixels in the same column are coupled to a second data line. The time-division multiplexing circuit is coupled to the plurality of first data lines, the plurality of second data lines, and a data signal terminal. The time-division multiplexing circuit is configured to electrically connect the data signal terminal to the first data lines and the second data lines in a time-division manner.

In some embodiments, the time-division multiplexing circuit includes at least two gating branches. A first end of a gating branch is coupled to the data signal terminal, and a second end of the gating branch is coupled to at least one first data line or at least one second data line. All the gating branches are configured to be turned on in different time periods, and on-state time periods of all the gating branches are arranged in sequence and do not overlap with each other.

In some embodiments, the at least two gating branches include a first gating branch and a second gating branch. A first end of the first gating branch is coupled to the data signal terminal, and a second end of the first gating branch is coupled to all the first data lines. The first gating branch is configured to electrically connect the data signal terminal to all the first data lines in a first time period. A first end of the second gating branch is coupled to the data signal terminal, and a second end of the second gating branch is coupled to all the second data lines. The second gating branch is configured to electrically connect the data signal terminal to all the second data lines in a second time period. The first time period and the second time period are arranged in sequence and do not overlap.

In some embodiments, the at least two gating branches include a first gating branch, a second gating branch, a third gating branch and a fourth gating branch. A first end of the first gating branch is coupled to the data signal terminal, and a second end of the first gating branch is coupled to all first data lines coupled to sub-pixels located in odd-numbered columns. The first gating branch is configured to electrically connect the data signal terminal to all the first data lines coupled to the sub-pixels located in the odd-numbered columns in a first time period. A first end of the second gating branch is coupled to the data signal terminal, and a second end of the second gating branch is coupled to all first data lines coupled to sub-pixels located in even-numbered columns. The second gating branch is configured to electrically connect the data signal terminal to all the first data lines coupled to the sub-pixels located in the even-numbered columns in a second time period. A first end of the third gating branch is coupled to the data signal terminal, and a second end of the third gating branch is coupled to all second data lines coupled to another sub-pixels located in the odd-numbered columns. The third gating branch is configured to electrically connect the data signal terminal to all the second data lines coupled to the another sub-pixels located in the odd-numbered columns in a third time period. A first end of the fourth gating branch is coupled to the data signal terminal, and a second end of the fourth gating branch is coupled to all second data lines coupled to another sub-pixels located in the even-numbered columns. The fourth gating branch is configured to electrically connect the data signal terminal to all the second data lines coupled to the another sub-pixels located in the even-numbered columns in a fourth time period. The first time period, the second time period, the third time period and the fourth time period are arranged in sequence and do not overlap with each other.

In some embodiments, the data signal terminal includes a plurality of data signal sub-terminals, and a data signal sub-terminal is coupled to a data line, of all data lines, connected to each gating branch.

In some embodiments, a first data line connected to sub-pixels in each column is located on a first side of the sub-pixels in the column, and a second data line connected to another sub-pixels in the column is located on a second side of the another sub-pixels in the column.

In some embodiments, a first data line connected to sub-pixels in an odd-numbered column is located on a first side of the sub-pixels in the odd-numbered column, and a second data line connected to another sub-pixels in the odd-numbered column is located on a second side of the another sub-pixels in the odd-numbered column. A first data line connected to sub-pixels in an even-numbered column is located on a second side of the sub-pixels in the even-numbered column, and a second data line connected to another sub-pixels in the even-numbered column is located on a first side of the another sub-pixels in the even-numbered column.

In another aspect, a display device is provided. The display device includes the display panel as described in any one of the above embodiments.

In yet another aspect, a method for driving a display panel, which is used for driving the display panel as described in any one of the above embodiments, is provided. The method includes: electrically connecting, by the time-division multiplexing circuit, the data signal terminal to the first data lines and the second data lines in a time-division manner, so as to input data signals output by the data signal terminal to the first data lines and the second data lines in a time-division manner; inputting, by the pixel control circuit, gate control signals to all rows of sub-pixels in a time-division manner, so as to turn on pixel circuits in the rows of sub-pixels, signal-inputting time periods in which the gate control signals are input to adjacent two rows of sub-pixels partially overlapping, and inputting, by the first data lines and the second data lines, data signals to the rows of sub-pixels in a time-division manner according to on/off states of the pixel circuits in the rows of sub-pixels.

In some embodiments, the time-division multiplexing circuit includes at least two gating branches. Electrically connecting, by the time-division multiplexing circuit, the data signal terminal to the first data lines and the second data lines in a time-division manner, so as to input the data signals output by the data signal terminal to the first data lines and the second data lines in a time-division manner, includes: controlling different gating branches to be turned on in different time periods, on-state time periods of all gating branches being arranged in sequence and not overlapping with each other.

In some embodiments, a start moment of a time period in which a data line connected to a sub-pixel is electrically connected to the data signal terminal, is before a start moment of a signal-inputting time period of a gate control signal of the sub-pixel. An end moment of the time period in which the data line connected to the sub-pixel is electrically connected to the data signal terminal, is before an end moment of the signal-inputting time period of the gate control signal of the sub-pixel. The data line is the first data line or the second data line.

In some embodiments, the at least two gating branches include a first gating branch and a second gating branch. Electrically connecting, by the time-division multiplexing circuit, the data signal terminal to the first data lines and the second data lines in a time-division manner, so as to input the data signals output by the data signal terminal to the first data lines and the second data lines in a time-division manner, includes: in a first time period, electrically connecting, by the first gating branch, the data signal terminal to all the first data lines, so as to input the data signals output by the data signal terminal to all the first data lines, and in a second time period, electrically connecting, by the second gating branch, the data signal terminal to all the second data lines, so as to input the data signals output by the data signal terminal to all the second data lines. The first time period and the second time period are arranged in sequence and do not overlap.

In some embodiments, a start moment of the first time period is before a start moment of a signal-inputting time period of a gate control signal of sub-pixels in a first row, and an end moment of the first time period is before an end moment of the signal-inputting time period of the gate control signal of the sub-pixels in the first row. A start moment of the second time period is before a start moment of a signal-inputting time period of a gate control signal of sub-pixels in a second row, and an end moment of the second time period is before an end moment of the signal-inputting time period of the gate control signal of the sub-pixels in the second row.

In some embodiments, the at least two gating branches include a first gating branch, a second gating branch, a third gating branch and a fourth gating branch. Electrically connecting, by the time-division multiplexing circuit, the data signal terminal to the first data lines and the second data lines in a time-division manner, so as to input the data signals output by the data signal terminal to the first data lines and the second data lines in a time-division manner, includes: in a first time period, electrically connecting, by the first gating branch, the data signal terminal to all first data lines coupled to sub-pixels located in odd-numbered columns, so as to input the data signals output by the data signal terminal to all the first data lines coupled to the sub-pixels located in the odd-numbered columns; in a second time period, electrically connecting, by the second gating branch, the data signal terminal to all first data lines coupled to sub-pixels located in even-numbered columns, so as to input the data signals output by the data signal terminal to all the first data lines coupled to the sub-pixels located in the even-numbered columns; in a third time period, electrically connecting, by the third gating branch, the data signal terminal to all second data lines coupled to another sub-pixels located in the odd-numbered columns, so as to input the data signals output by the data signal terminal to all the second data lines coupled to the another sub-pixels located in the odd-numbered columns; and in a fourth time period, electrically connecting, by the fourth gating branch, the data signal terminal to all second data lines coupled to another sub-pixels located in the even-numbered columns, so as to input the data signals output by the data signal terminal to all the second data lines coupled to the another sub-pixels located in the even-numbered columns. The first time period, the second time period, the third time period and the fourth time period are arranged in sequence and do not overlap with each other.

In some embodiments, a start moment of the first time period is before a start moment of a signal-inputting time period of a gate control signal of sub-pixels in a first row. An end moment of the second time period is before an end moment of the signal-inputting time period of the gate control signal of the sub-pixels in the first row. A start moment of the third time period is before a start moment of a signal-inputting time period of a gate control signal of sub-pixels in a second row. An end moment of the fourth time period is before an end moment of the signal-inputting time period of the gate control signal of the sub-pixels in the second row.

In some embodiments, an end moment of the first time period is before a start moment of a signal-inputting time period of a gate control signal of sub-pixels in a first row. A start moment of the second time period is before the start moment of the signal-inputting time period of the gate control signal of the sub-pixels in the first row. An end moment of the third time period is before a start moment of a signal-inputting time period of a gate control signal of sub-pixels in a second row. A start moment of the fourth time period is before the start moment of the signal-inputting time period of the gate control signal of the sub-pixels in the second row.

In some embodiments, an end moment of a signal-inputting time period of a gate control signal of sub-pixels in a first row is before a start moment of a next first time period. An end moment of a signal-inputting time period of a gate control signal of sub-pixels in a second row is before a start moment of a next third time period.

In some embodiments, each gating branch includes a plurality of gating devices, a control terminal of each gating device is configured to receive a gating signal, a first terminal of the gating device is coupled to a corresponding first data line or second data line, and a second terminal of the gating device is coupled to the data signal terminal.

BRIEF DESCRIPTION OF THE DRAWINGS

In order to describe technical solutions in the present disclosure more clearly, accompanying drawings to be used in some embodiments of the present disclosure will be introduced briefly below. However, the accompanying drawings to be described below are merely accompanying drawings of some embodiments of the present disclosure, and a person of ordinary skill in the art may obtain other drawings according to these drawings.

In addition, the accompanying drawings to be described below may be regarded as schematic diagrams, and are not limitations on an actual size of a product, an actual process of a method and actual timings of signals involved in the embodiments of the present disclosure.

DETAILED DESCRIPTION

Figure 1:
FIG. 1 is a structural diagram of a display device provided in some embodiments.

Technical solutions in some embodiments of the present disclosure will be described clearly and completely below with reference to the accompanying drawings. However, the described embodiments are merely some but not all embodiments of the present disclosure. All other embodiments obtained by a person of ordinary skill in the art based on the embodiments of the present disclosure shall be included in the protection scope of the present disclosure.

Unless the context requires otherwise, throughout the description and the claims, the term "comprise" and other forms thereof such as the third-person singular form "comprises" and the present participle form "comprising" are construed in an open and inclusive meaning, i.e., "including, but not limited to". In the description of the specification, the terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials or characteristics may be included in any one or more embodiments or examples in any suitable manner.

Hereinafter, the terms "first" and "second" are used for descriptive purposes only, and are not to be construed as indicating or implying the relative importance or implicitly indicating the number of indicated technical features. Thus, a feature defined with "first" or "second" may explicitly or implicitly include one or more of the features. In the description of the embodiments of the present disclosure, the term "multiple", "a plurality of" or "the plurality of" means two or more unless otherwise specified.

In the description of some embodiments, the term "coupled", "connected" and derivatives thereof may be used. For example, the term "connected" may be used in the description of some embodiments to indicate that two or more components are in direct physical or electrical contact with each other. For another example, the term "coupled" may be used in the description of some embodiments to indicate that two or more components are in direct physical or electrical contact. However, the term "coupled" or "communicatively coupled" may also mean that two or more components are not in direct contact with each other, but still cooperate or interact with each other. The embodiments disclosed herein are not necessarily limited to the content herein.

The phrase "applicable to" or "configured to" as used herein indicates an open and inclusive expression, which does not exclude devices that are applicable to or configured to perform additional tasks or steps.

Organic light-emitting diode (OLED) display devices generally include a plurality of sub-pixels, and each sub-pixel includes a pixel circuit. A threshold voltage (Vth) of a driving transistor in each pixel circuit may drift due to differences in the manufacturing process or changes in temperature, which may result in a poor display effect. Therefore, the Vth of the driving transistor needs to be compensated.

In a traditional driving method, the compensation time is equal to the data writing time. Both virtual reality (VR) display and gaming modes require a high refresh rate of a display panel. In a case where the refresh rate of the display panel is high (e.g., 120 Hz), the row cycle is short, the data writing time is short, and the compensation time of Vth is greatly reduced, resulting in insufficient compensation of Vth of the driving transistor in the pixel circuit and thus a poor display effect.

In addition, as the resolution improves, a driving integrated circuit (IC) requires more and more data channels (each data channel corresponds to a single data line), and some display panels (such as medium-sized display panels) may even need to be driven by two ICs, which greatly increases the cost of the display panels.

Based on this, some embodiments of the present disclosure provide a display device 10. Referring to FIG. 1, the display device 10 includes a display panel 1 provided in some embodiments of the present disclosure.

The display device 10 may be a mobile phone, a tablet computer, a notebook computer, an ultra-mobile personal computer (UMPC), a handhold computer, a netbook, a personal digital assistant (PDA), a wearable device, a VR device or any other electronic device with a flexible screen. The present disclosure does not limit the specific use of the display device 10.

For example, the display device 10 may be an electroluminescent display or a photoluminescent display. In a case where the display device 10 is an electroluminescent display, the electroluminescent display may be an OLED display or a quantum dot light-emitting diode (QLED) display. In a case where the display device 10 is a photoluminescent display, the photoluminescent display may be a quantum dot photoluminescent display device.

Figure 2:
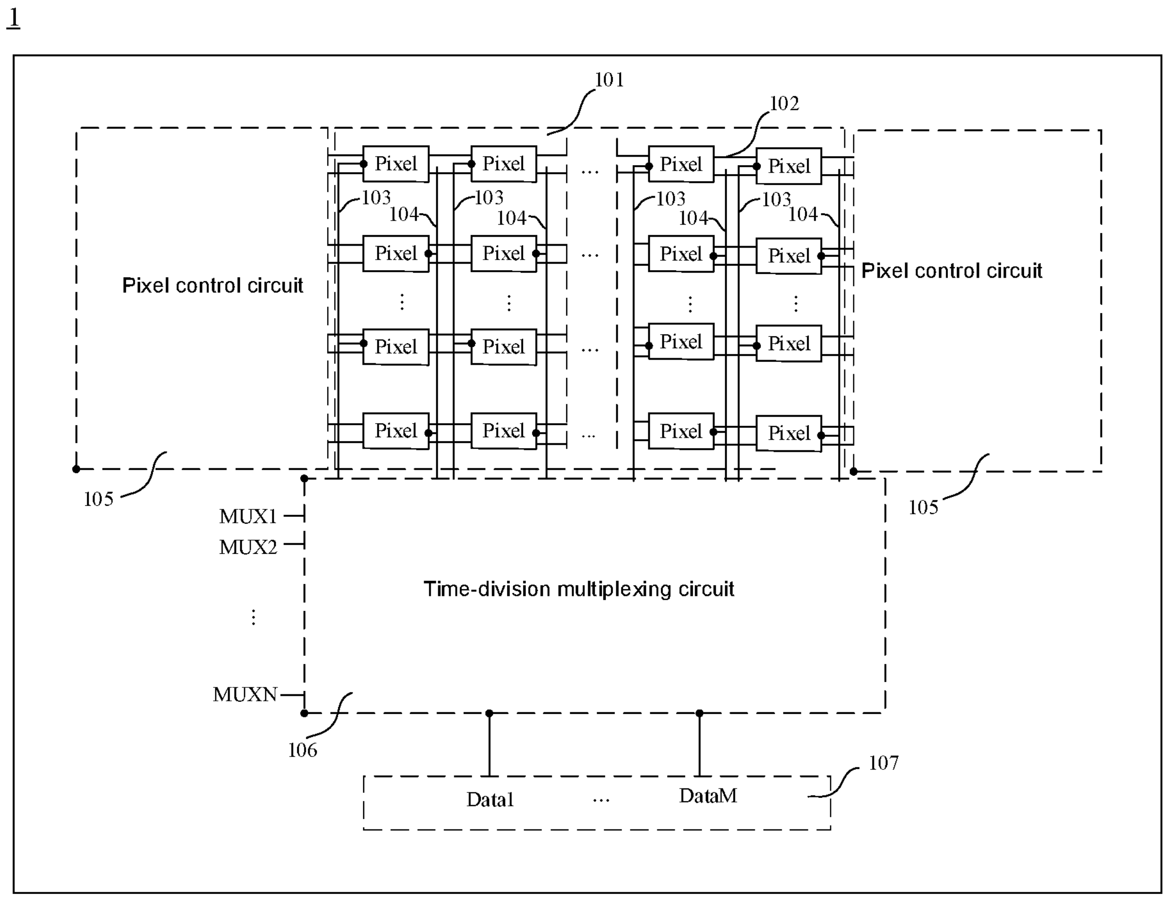
FIG. 2 is a structural diagram of a display panel provided in some embodiments.

Referring to FIG. 2, the embodiments of the present disclosure provide the display panel 1. The display panel 1 may be used in any of the display devices 10 mentioned above.

The display panel 1 includes: a sub-pixel array 101, a plurality of gate lines 102, a plurality of first data lines 103, a plurality of second data lines 104, pixel control circuits 105, and a time-division multiplexing circuit 106.

The sub-pixel array 101 includes a plurality of sub-pixels (as indicated by Pixel in FIG. 2) arranged in a plurality of rows and a plurality of columns. Sub-pixels located in a same row are coupled to the pixel control circuits 105 through at least one gate line 102. Sub-pixels located in odd-numbered rows in sub-pixels located in a same column are coupled to a first data line 103, and sub-pixels located in even-numbered rows in the sub-pixels located in the same column are coupled to a second data line 104.

The time-division multiplexing circuit 106 is coupled to the plurality of first data lines 103, the plurality of second data lines 104, and a data signal terminal 107. The time-division multiplexing circuit is configured to electrically connect the data signal terminal to the first data lines and the second data lines in a time-division manner.

It will be noted that, the data signal terminal 107 is disposed on the driving IC. The data signal terminal 107 corresponds to the data channels of the driving IC, and is used for outputting data signals of the driving IC.

In the display panel provided in the embodiments of the present disclosure, based on the time-division electrical conduction function of the time-division multiplexing circuit, the data signals output by the data signal terminal may be written into the first data lines and the second data lines in a time-division manner. Through the time-division multiplexing circuit, a single data signal terminal may be coupled to multiple data lines. Therefore, compared with the solution in the related art where a single data signal terminal is coupled to a single data line, when the embodiments of the present disclosure and the related art have a same number of data lines, in the embodiments of the present disclosure, a plurality of data lines may be driven with less data channels through a time-division operation. As a result, the number of data channels of the driving IC may be reduced; or, the number of driving ICs may be reduced. Through the time-division multiplexing circuit, data signals may be written into multiple data lines at once; in this way, the output frequency of the data signals of the driving IC may be reduced, and a high refresh rate of the display panel may be realized, which makes it more suitable for scenarios requiring high refresh rates. In addition, through the time-division electrical conduction function of the time-division multiplexing circuit, signal-inputting time periods of gate control signals of adjacent two rows of sub-pixels may partially overlap, which may prolong the compensation time of the Vth of the driving transistor and solve the problem of insufficient compensation of the Vth of the driving transistor.

In some embodiments, the time-division multiplexing circuit 106 includes at least two gating branches. A first end of the gating branch is coupled to the data signal terminal 107, and a second end of the gating branch is coupled to at least one first data line 103 or at least one second data line 104. The gating branches are configured to be turned on in different time periods, and on-state time periods of all the gating branches are arranged in sequence and do not overlap with each other.

In the time-division multiplexing circuit, different gating branches may be turned on in a time-division manner, so as to transmit data signals of the data signal terminal to data lines connected to the gating branches and write the data signals into the sub-pixels connected to the data lines in a time-division manner. By arranging that different gating branches are turned on in sequence, and their on-state time periods do not overlap, the data signals may be sequentially written into sub-pixels in different parts in a specific order in one cycle.

Figure 3:
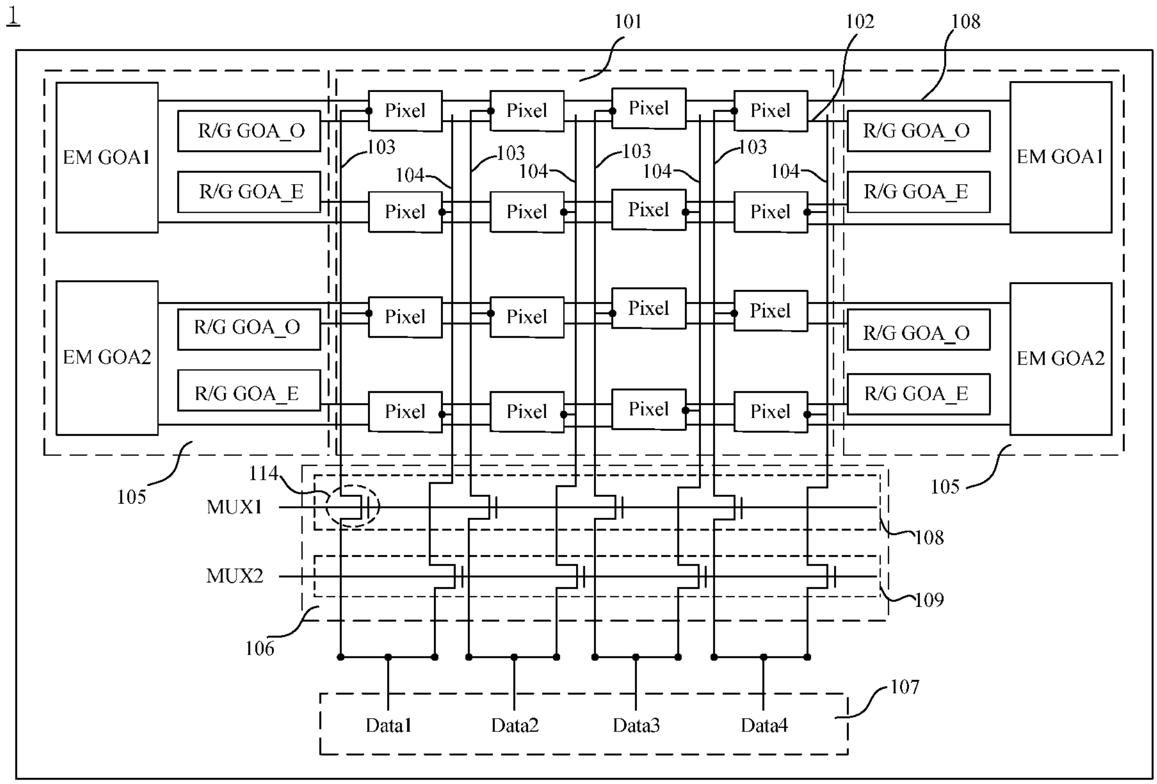
FIG. 3 is a structural diagram of another display panel provided in some embodiments.

In some embodiments, referring to FIG. 3, the "at least two gating branches" include a first gating branch 108 (i.e., the branch input with the gating signal MUX1 in FIG. 3) and a second gating branch 109 (i.e., the branch input with the gating signal MUX2 in FIG. 3). A first end of the first gating branch 108 is coupled to the data signal terminal 107, and a second end of the first gating branch 108 is coupled to all the first data lines 103. The first gating branch 108 is configured to electrically connect the data signal terminal 107 to all the first data lines 103 in a first time period. A first end of the second gating branch 109 is coupled to the data signal terminal 107, and a second end of the second gating branch 109 is coupled to all the second data lines 104. The second gating branch 109 is configured to electrically connect the data signal terminal 107 to all the second data lines 104 in a second time period. The first time period and the second time period are arranged in sequence and do not overlap.

FIG. 3 shows a sub-pixel array with four rows and four columns and circuits and connection lines coupled to the sub-pixel array. This figure is only an example and is not intended to limit the scope of the present disclosure. It may be understood by those skilled in art that, the circuit connection relationship as shown in the figure may be extended to a sub-pixel array with m rows and n columns, and both m and n may be greater than 4.

In the above solution where there are two gating branches, through a single data channel of the driving IC, two data lines (i.e., a first data line and a second data line) may be driven in a time-division manner. Therefore, the number of data channels may be reduced by half.

Figure 4:
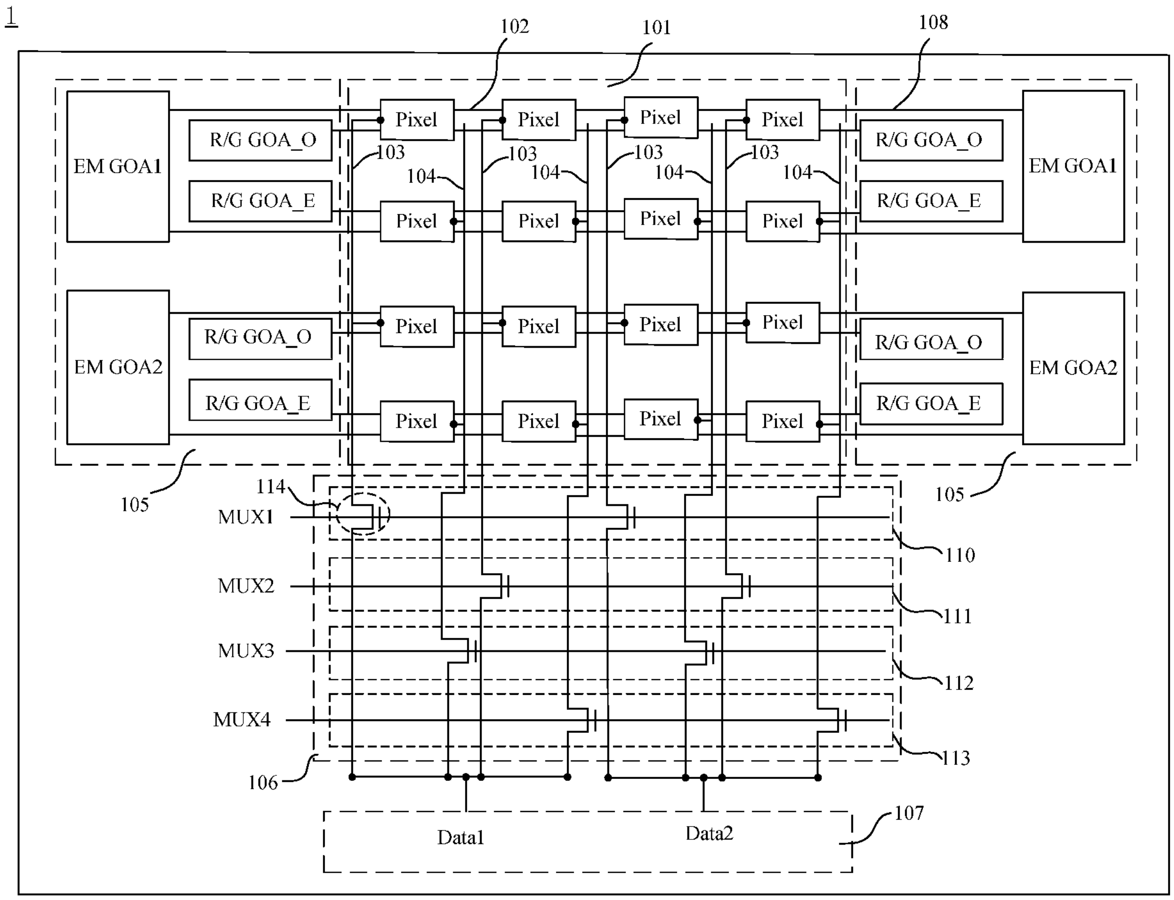
FIG. 4 is a structural diagram of yet another display panel provided in some embodiments.
Figure 5:
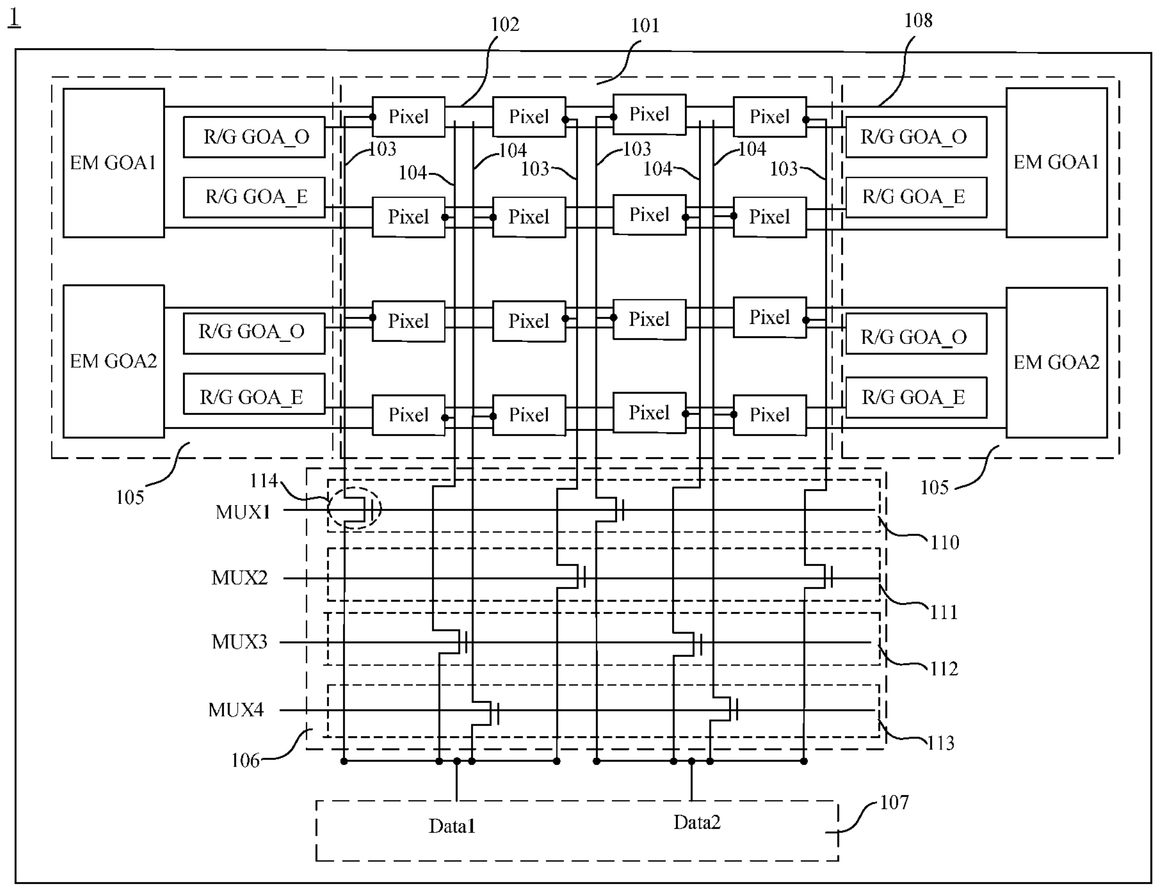
FIG. 5 is a structural diagram of yet another display panel provided in some embodiments.

In some embodiments, referring to FIGS. 4 and 5, the "at least two gating branches" include: a first gating branch 110 (i.e., the branch input with the gating signal MUX1 in the figures), a second gating branch 111 (i.e., the branch input with the gating signal MUX2 in the figures), a third gating branch 112 (i.e., the branch input with the gating signal MUX3 in the figures), and a fourth gating branch 113 (i.e., the branch input with the gating signal MUX4 in the figures).

Referring to FIGS. 4 and 5, a first end of the first gating branch 110 is coupled to the data signal terminal 107, and a second end of the first gating branch 110 is coupled to all first data lines 103 coupled to sub-pixels located in odd-numbered columns. The first gating branch 110 is configured to electrically connect the data signal terminal 107 to all the first data lines 103 coupled to the sub-pixels located in the odd-numbered columns in a first time period. A first end of the second gating branch 111 is coupled to the data signal terminal 107, and a second end of the second gating branch 111 is coupled to all first data lines 103 coupled to sub-pixels located in even-numbered columns. The second gating branch 111 is configured to electrically connect the data signal terminal 107 to all the first data lines 103 coupled to the sub-pixels located in the even-numbered columns in a second time period. A first end of the third gating branch 112 is coupled to the data signal terminal 107, and a second end of the third gating branch 112 is coupled to all second data lines 104 coupled to another sub-pixels located in the odd-numbered columns. The third gating branch 112 is configured to electrically connect the data signal terminal 107 to all the second data lines 104 coupled to the another sub-pixels located in the odd-numbered columns in a third time period. A first end of the fourth gating branch 113 is coupled to the data signal terminal 107, and a second end of the fourth gating branch 113 is coupled to all second data lines 104 coupled to another sub-pixels located in the even-numbered columns. The fourth gating branch 113 is configured to electrically connect the data signal terminal 107 to all the second data lines 104 coupled to the another sub-pixels located in the even-numbered columns in a fourth time period. The first time period, the second time period, the third time period and the fourth time period are arranged in sequence and do not overlap with each other.

In the above solution where there are four gating branches, through a single data channel of the driving IC, four data lines (i.e., two first data lines and two second data lines) may be driven in a time-division manner. Therefore, the number of data channels may be further reduced by half on the basis of the solution with two gating branches.

In some examples, referring to FIGS. 3 to 5, the pixel control circuit 105 includes at least one scan signal shift register circuit (i.e., gate driver on array (GOA)) for providing scan signals. The at least one scan signal shift register circuit is coupled to rows of sub-pixels through gate lines (which may be that a single scan signal shift register circuit is coupled to the rows of sub-pixels, or that a plurality of scan signal shift register circuits are coupled to the rows of sub-pixels), so as to drive the rows of sub-pixels.

For example, referring to FIGS. 3 to 5, the pixel control circuit 105 includes gate driving circuits R/G GOA_O for driving sub-pixels located in odd-numbered rows and gate driving circuits R/G GOA_E for driving sub-pixels located in even-numbered rows. The gate driving circuit R/G GOA_O drives a row of sub-pixels connected thereto by outputting a gate control signal (i.e., a signal Gate), and the gate driving circuit R/G GOA_E drives a row of sub-pixels connected thereto by outputting a gate control signal (i.e., a signal Gate).

In some examples, referring to FIGS. 3 to 5, the pixel control circuit 105 further includes light-emitting control signal shift register circuit(s) EM GOA for providing light-emitting control signals. The light-emitting control signal shift register circuit EM GOA may be coupled to each sub-pixel of a row of sub-pixels through a light-emitting control signal line 108.

For example, there may be one light-emitting control signal shift register circuit EM GOA; or, there may be a plurality of light-emitting control signal shift register circuits EM GOA, as shown in FIGS. 3 to 5 (for example, there are two light-emitting control signal shift register circuits EM GOA1 and two light-emitting control signal shift register circuits EM GOA2 in FIGS. 3 to 5). The plurality of light-emitting control signal shift register circuits EM GOA may be disposed on a same side of the sub-pixel array 101, or may also be disposed on both sides of the sub-pixel array 101, as shown in FIGS. 3 to 5.

In some examples, referring to FIGS. 3 to 5, each gating branch includes a plurality of gating devices 114. A control terminal of each gating device 114 is coupled to a gating signal control circuit, so as to receive a gating signal output by the gating signal control circuit. A first terminal of each gating device 114 is coupled to a corresponding first data line 103 or second data line 104, and a second terminal of each gating device 114 is coupled to the data signal terminal 107.

For example, considering the gating devices 114 of the first gating branch 110 shown in FIG. 4 as an example, control terminals of the two gating devices 114 are coupled to the gating signal control circuit, so as to receive the gating signal MUX1. A first terminal of a first gating device 114 is coupled to a first data line 103 of a first column (i.e., the first data line 103 coupled to all sub-pixels located in the odd-numbered rows in sub-pixels located in the first column), and a second terminal of the first gating device 114 is coupled to a data signal sub-terminal Data1 in the data signal terminal 107. A first terminal of a second gating device 114 is coupled to a first data line 103 of a third column (i.e., the first data line 103 coupled to all sub-pixels located in the odd-numbered rows in sub-pixels located in the third column), and a second terminal of the second gating device 114 is coupled to a data signal sub-terminal Data2 in the data signal terminal 107. Referring to FIGS. 3 to 5, connection manners of gating devices in other gating branches are the same, and details will not be repeated here.

For example, the gating device 114 may be a P-type or N-type transistor.

In some examples, the display panel further includes a gating signal control circuit for outputting gating signals.

In some examples, in a case where the frequency of the data signal terminal is large, due to parasitic capacitance in the data line, when the data signal terminal is disconnected from the data line, the data line may store a to-be-written data signal; and when the data line is connected to corresponding sub-pixels, the data line may write the data signal into the corresponding sub-pixels.

In some embodiments, referring to FIGS. 3 to 5, the data signal terminal 107 includes a plurality of data signal sub-terminals (i.e., Data1, Data2, Data3 and Data4 in FIG. 3, Data1 and Data2 in FIG. 4, and Data1 and Data2 in FIG. 5). A single data signal sub-terminal is coupled to a single data line, of all data lines, connected to each gating branch.

Each data signal sub-terminal corresponds to a data channel of the driving IC, and different data lines connected to the same gating branch are connected to different data signal sub-terminals, so that different data signals may be written into all the data lines connected to the same gating branch in a same time period.

In some examples, referring to FIG. 3, the first gating branch 108 is coupled to all the first data lines 103, and the second gating branch 109 is coupled to all the second data lines 104. The data signal terminal 107 includes four data signal sub-terminals, i.e., Data1, Data2, Data3 and Data4 in FIG. 3. The data signal sub-terminal Data1 is coupled to a first first data line 103 coupled to the first gating branch 108 and a first second data line 104 coupled to the second gating branch 109. The data signal sub-terminal Data2 is coupled to a second first data line 103 coupled to the first gating branch 108 and a second second data line 104 coupled to the second gating branch 109. The data signal sub-terminal Data3 is coupled to a third first data line 103 coupled to the first gating branch 108 and a third second data line 104 coupled to the second gating branch 109. The data signal sub-terminal Data4 is coupled to a fourth first data line 103 coupled to the first gating branch 108 and a fourth second data line 104 coupled to the second gating branch 109. This arrangement allows different data signals to be written into the same row of sub-pixels.

In some other examples, referring to FIGS. 4 and 5, the first gating branch 110 is coupled to all the first data lines 103 corresponding to sub-pixels located in odd-numbered columns, the second gating branch 111 is coupled to all the first data lines 103 corresponding to sub-pixels located in even-numbered columns, the third gating branch 112 is coupled to all the second data lines 104 corresponding to another sub-pixels located in the odd-numbered columns, and the fourth gating branch 113 is coupled to all the second data lines 104 corresponding to another sub-pixels located in the even-numbered columns. The data signal terminal 107 includes two data signal sub-terminals, i.e., Data1 and Data2 in FIG. 4, and Data1 and Data2 in FIG. 5. The data signal sub-terminal Data1 is coupled to a first first data line 103 coupled to the first gating branch 110, a first first data line 103 coupled to the second gating branch 111, a first second data line 104 coupled to the third gating branch 112 and a first second data line 104 coupled to the fourth gating branch 113. The data signal sub-terminal Data2 is coupled to a second first data line 103 coupled to the first gating branch 110, a second first data line 103 coupled to the second gating branch 111, a second second data line 104 coupled to the third gating branch 112 and a second second data line 104 coupled to the fourth gating branch 113. This arrangement allows different data signals to be written into data lines connected to each gating branch in the same time period.

In some embodiments, referring to FIGS. 3 to 5, the first data line 103 connected to sub-pixels in each column is located on a first side of the sub-pixels in the column, and the second data line 104 connected to sub-pixels in each column is located on a second side of the sub-pixels in the column.

Each column of sub-pixels is connected to a single first data line and a single second data line, and the two data lines are located on both sides of the column of sub-pixels, respectively. With such wiring, the plurality of data lines may be arranged in a uniform and orderly manner, which facilitates actual production.

In some embodiments, referring to FIG. 5, the first data line 103 connected to sub-pixels located in an odd-numbered column is located on a first side of sub-pixels in the odd-numbered column, and the second data line 104 connected to the sub-pixels located in the odd-numbered column is located on a second side of the sub-pixels in the odd-numbered column. The first data line 103 connected to sub-pixels in an even-numbered column is located on a second side of the sub-pixels in the even-numbered column, and the second data line 104 connected to the sub-pixels in the even-numbered column is located on a first side of the sub-pixels in the even-numbered column.

The circuit connection relationship shown in FIG. 4 is the same as the circuit connection relationship shown in FIG. 5, with a difference lying only in the distribution of the data lines.

Figure 6:
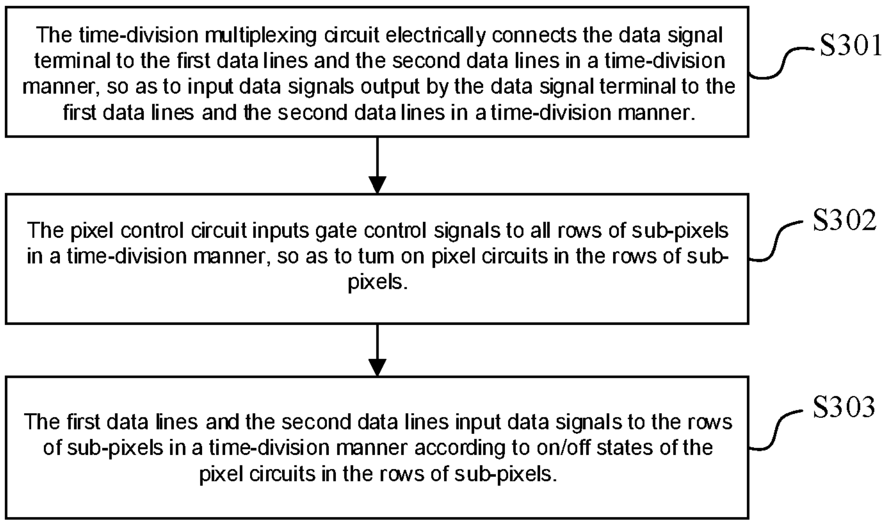
FIG. 6 is a flow diagram of a method for driving a display panel provided in some embodiments.

Some embodiments of the present disclosure provide a method for driving a display panel, which is used for driving the display panel provided in any one of the above embodiments. As shown in FIG. 6, the method for driving the display panel includes the following steps.

In S301, the time-division multiplexing circuit 106 electrically connects the data signal terminal 107 to the first data lines 103 and the second data lines 104 in a time-division manner, so as to input data signals output by the data signal terminal 107 to the first data lines 103 and the second data lines 104 in a time-division manner.

In S302, the pixel control circuit 105 inputs gate control signals to all rows of sub-pixels in a time-division manner, so as to turn on pixel circuits in the rows of sub-pixels. Signal-inputting time periods in which the gate control signals are input to adjacent two rows of sub-pixels partially overlap.

In S303, the first data lines 103 and the second data lines 104 input data signals to the rows of sub-pixels in a time-division manner according to on/off states of the pixel circuits in the rows of sub-pixels.

Since the time-division multiplexing circuit can connect different data lines to the data signal terminal in a time-division manner, the data signals may be written into the sub-pixels in a time-division manner. Based on this arrangement, signal-inputting time periods in which gate control signals are input into adjacent two rows of sub-pixels may be arranged to partially overlap with each other. In this way, the compensation time of each sub-pixel may be prolonged, and the compensation capability for the Vth of each sub-pixel may be improved.

In some examples, the time-division multiplexing circuit includes at least two gating branches. Electrically connecting, by the time-division multiplexing circuit, the data signal terminal 107 to the first data lines 103 and the second data lines 104 in a time-division manner, so as to input the data signals output by the data signal terminal 107 to the first data lines 103 and the second data lines 104 in a time-division manner, includes: controlling different gating branches to be turned on in different time periods, on-state time periods of all gating branches being arranged in sequence and not overlapping with each other.

The time-division multiplexing circuit includes at least two gating branches, different gating branches are coupled to different data lines, and the different gating branches are connected the data signal terminal to the different data lines in a time-division manner, so that the data signals may be written into the sub-pixels in a time-division manner.

In some examples, a start moment of a time period in which a data line connected to a sub-pixel is electrically connected to the data signal terminal, is before a start moment of a signal-inputting time period of a gate control signal of the sub-pixel. An end moment of a time period in which the data line connected to the sub-pixel is electrically connected to the data signal terminal, is before an end moment of the signal-inputting time period of the gate control signal of the sub-pixel. The data line is the first data line or the second data line.

For a sub-pixel, a data signal is written into the sub-pixel first through a data line, then a gate control signal is written into the sub-pixel through a gate line, and the writing of the data signal is completed before the end of the writing of the gate control signal, so that the sub-pixel works normally.

Figure 7:
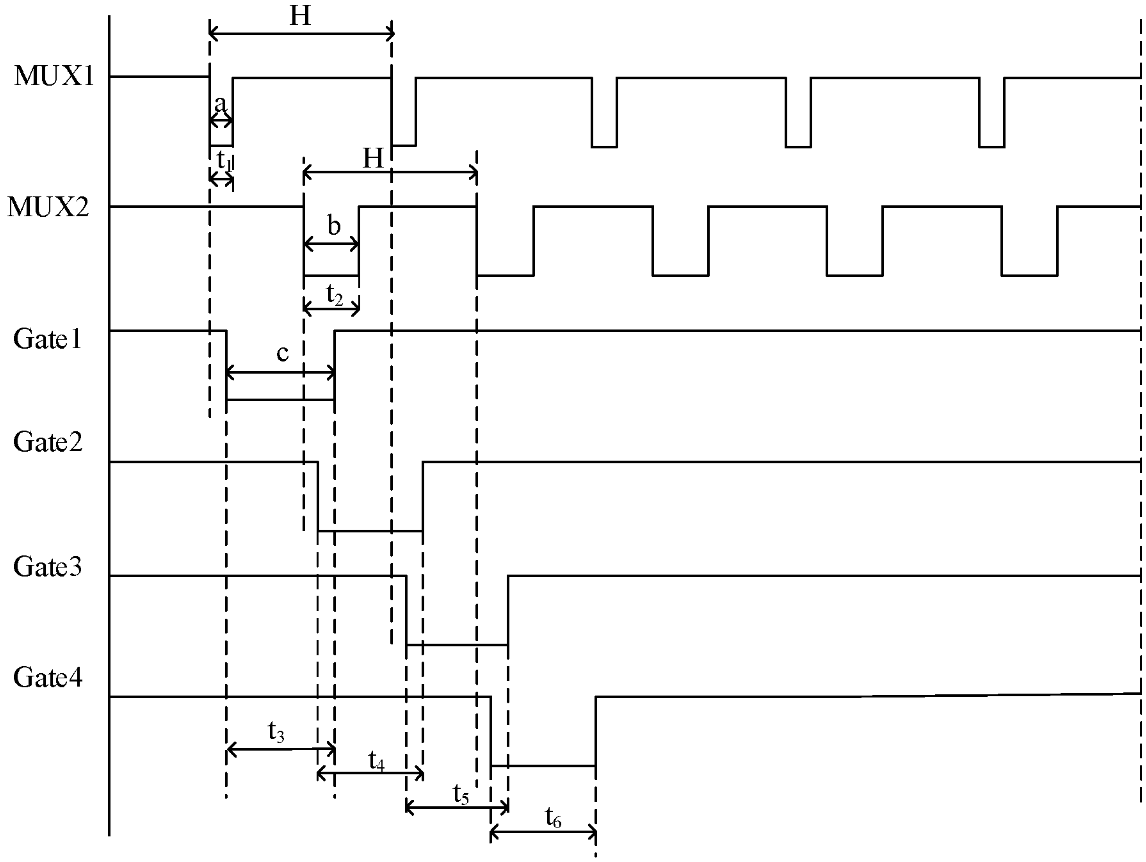
FIG. 7 is a signal timing chart of corresponding gating signals and gate control signals of the display panel in FIG. 3.

In some embodiments, referring to FIGS. 3 and 7, the "at least two gating branches" include a first gating branch 108 and a second gating branch 109. In this case, S301 includes the following processes: in a first time period t1, the first gating branch 108 electrically connects the data signal terminal 107 to all the first data lines 103, so as to input the data signals output by the data signal terminal 107 to all the first data lines 103, and in a second time period t2, the second gating branch 109 electrically connects the data signal terminal 107 to all the second data lines 104, so as to input the data signals output by the data signal terminal 107 to all the second data lines 104. The first time period t1 and the second time period t2 are arranged in sequence and do not overlap.

In some embodiments, referring to FIG. 7, a start moment of the first time period t1 is before a start moment of a signal-inputting time period (i.e., the third time period t3 in FIG. 7) of a gate control signal of sub-pixels in a first row, and an end moment of the first time period t1 is before an end moment of the signal-inputting time period (i.e., the third time period t3 in FIG. 7) of the gate control signal of the sub-pixels in the first row. A start moment of the second time period t2 is before a start moment of a signal-inputting time period (i.e., the fourth time period t4 in FIG. 7) of a gate control signal of sub-pixels in a second row, and an end moment of the second time period t2 is before an end moment of the signal-inputting time period (i.e., the fourth time period t4 in FIG. 7) of the gate control signal of the sub-pixels in the second row.

This arrangement may ensure that: a data signal is written into a sub-pixel first through a data line, then a gate control signal is written into the sub-pixel through a gate line, and the writing of the data signal is completed before the end of the writing of the gate control signal, so that the sub-pixel works normally.

In some examples, referring to FIGS. 3 and 7, the gating devices 114 are P-type transistors. In the first time period t1 (the duration of which is a in FIG. 7), the gating signal MUX1 is at a low level; after receiving the gating signal MUX1, the first gating branch 108 electrically connects the four signal data signal sub-terminals Data1, Data2, Data3 and Data4 to the first data lines 103 respectively, so as to write first to fourth data signals into the corresponding first data lines 103 respectively to be stored. The first data signal is transmitted by the data signal sub-terminal Data1, the second data signal is transmitted by the data signal sub-terminal Data2, the third data signal is transmitted by the data signal sub-terminal Data3, and the fourth data signal is transmitted by the data signal sub-terminal Data4.

Referring to FIG. 7, in the second time period t2 (the duration of which is b in FIG. 7) after the first time period t1, the gating signal MUX1 is at a high level, and the gating signal MUX2 is at a low level; after receiving the gating signal MUX2, the second gating branch 109 electrically connects the four signal data signal sub-terminals Data1, Data2, Data3 and Data4 to the second data lines 104 respectively, so as to write the first to fourth data signals are into the corresponding second data lines 104 respectively to be stored.

Referring to FIG. 7, in the third time period t3 (the duration of which is c) after the first time period t1, a gate control signal Gate1 output by a gate driving circuit R/G GOA_O of the first row is at a low level. As a result, pixel circuits in sub-pixels in the first row are turned on, and the first data lines 103 connected to the sub-pixels in the first row write the stored first data signal into the sub-pixel located in the first row and the first column, write the stored second data signal into the sub-pixel located in the first row and the second column, write the stored third data signal into the sub-pixel located in the first row and the third column, and write the stored fourth data signal into the sub-pixel located in the first row and the fourth column. Therefore, the data writing and the Vth compensation of sub-pixels in the first row may be completed in the third time period t3.

Referring to FIG. 7, in the fourth time period t4 (which partially overlaps with the third time period t3) after the second time period t2, a gate control signal Gate2 output by a gate driving circuit R/G GOA_E of the second row is at a low level. As a result, pixel circuits in sub-pixels in the second row are turned on, and the second data lines 104 connected to the sub-pixels in the second row write the stored first data signal into the sub-pixel located in the second row and the first column, write the second stored data signal into the sub-pixel located in the second row and the second column, write the stored third data signal into the sub-pixel located in the second row and the third column, and write the stored fourth data signal into the sub-pixel located in the second row and the fourth column. Therefore, the data writing and the Vth compensation of sub-pixels in the second row may be completed in the fourth time period t4. During the entire working time period, the first to fourth data signals are written into the first gating branch and the second gating branch according to a cycle H.

Referring to FIG. 7, in the fifth time period t5 (which partially overlaps with the fourth time period t4) after the fourth time period t4, a gate control signal Gate3 output by a gate driving circuit R/G GOA_O of the third row is at a low level. As a result, pixel circuits in sub-pixels in the third row are turned on, and the first data lines 103 connected to the sub-pixels in the third row write the stored first data signal into the sub-pixel located in the third row and the first column, write the stored second data signal into the sub-pixel located in the third row and the second column, write the stored third data signal into the sub-pixel located in the third row and the third column, and write the stored fourth data signal into the sub-pixel located in the third row and the fourth column. Therefore, the data writing and the Vth compensation of sub-pixels in the third row may be completed in the fifth time period t5.

Referring to FIG. 7, in the sixth time period t6 (which partially overlaps with the fifth time period t5) after the fifth time period t5, a gate control signal Gate4 output by a gate driving circuit R/G GOA_E of the fourth row is at a low level. As a result, pixel circuits in sub-pixels in the fourth row are turned on, and the second data lines 104 connected to the sub-pixels in the fourth row write the stored first data signal into the sub-pixel located in the fourth row and the first column, write the stored second data signal into the sub-pixel located in the fourth row and the second column, write the stored third data signal into the sub-pixel located in the fourth row and the third column, and write the stored fourth data signal into the sub-pixel located in the fourth row and the fourth column. Therefore, the data writing and the Vth compensation of sub-pixels in the fourth row may be completed in the fifth time period t6.

As can be seen from FIG. 7, there is an overlap between any two adjacent time periods from t3 to t6. Therefore, the data writing and the Vth compensation of sub-pixels in a next row has already started when the data writing and the Vth compensation of sub-pixels in a current row are still in progress, and there is no need to wait until the data writing and the Vth compensation of the sub-pixels in the current row to end to start the data writing and the Vth compensation of the sub-pixels in the next row. As a result, the data writing time and the Vth compensation time of the sub-pixels in the first row may be prolonged.

In some examples, referring to FIGS. 7, *a, b, c* and H in FIG. 7 all represent time durations.

a represents an acting duration of the data signal input to the first gating branch 108.

b represents an acting duration of the data signal input to the second gating branch 109.

c represents an acting duration of the gate control signal of each row.

H represents a row cycle of a data signal.

FIG. 7 only shows a timing diagram of the acting time periods of gate control signals of rows in one cycle. It will be understood that the gate control signals are also input into the rows in sequence according to a specific cycle.

The above examples describe the driving principle of sub-pixels in the first four rows of the sub-pixel array. The driving principle of the following rows are the same as that of the first four rows as shown in FIG. 7, and details will not repeated here.

Figure 8:
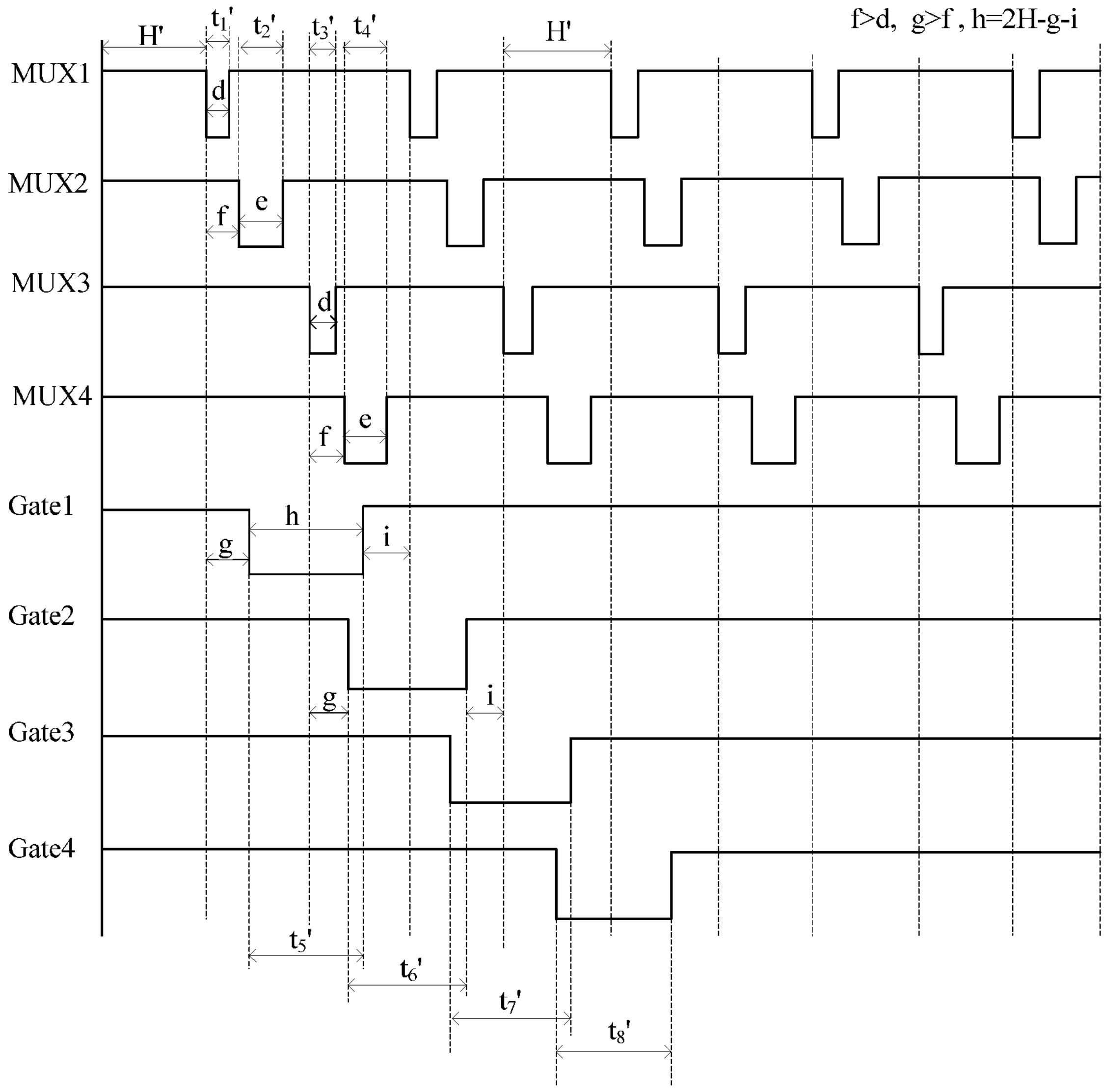
FIG. 8 is a signal timing chart of corresponding gating signals and gate control signals of the display panel in FIG. 4.

In some embodiments, referring to FIGS. 4 and 8, the "at least two gating branches" include: a first gating branch 110, a second gating branch 111, a third gating branch 112 and a fourth gating branch 113. In this case, S301 includes the following processes.

Referring to FIGS. 4 and 8, in a first time period t1', the first gating branch 110 electrically connects the data signal terminal 107 to all first data lines 103 coupled to sub-pixels located in odd-numbered columns, so as to input the data signals output by the data signal terminal 107 to all the first data lines 103 coupled to the sub-pixels located in the odd-numbered columns. In a second time period t2', the second gating branch 111 electrically connects the data signal terminal 107 to all first data lines 103 coupled to sub-pixels located in even-numbered columns, so as to input the data signals output by the data signal terminal 107 to all the first data lines 103 coupled to sub-pixels located in the even-numbered columns. In a third time period t3', the third gating branch 112 electrically connects the data signal terminal 107 to all second data lines 104 coupled to the sub-pixels located in the odd-numbered columns, so as to input the data signals output by the data signal terminal 107 to all the second data lines 104 coupled to the sub-pixels located in the odd-numbered columns. In the fourth time period t4', the fourth gating branch 113 electrically connects the data signal terminal 107 to all second data lines 104 coupled to sub-pixels located in the even-numbered columns, so as to input the data signals output by the data signal terminal 107 to all the second data lines 104 coupled to the sub-pixels located in the even-numbered columns. The first time period t1', the second time period t2', the third time period t3' and the fourth time period t4' are arranged in sequence and do not overlap with each other.

In some embodiments, referring to FIG. 8, a start moment of the first time period t1' is before a start moment of a signal-inputting time period (i.e., a fifth time period t5' in FIG. 8) of a gate control signal of sub-pixels in a first row. An end moment of the second time period t2' is before an end moment of the signal-inputting time period (i.e., the fifth time period t5' in FIG. 8) of the gate control signal of the sub-pixels in the first row. A start moment of the third time period t3' is before a start moment of a signal-inputting time period (i.e., a sixth time period t6' in FIG. 8) of a gate control signal of sub-pixels in a second row. An end moment of the fourth time period t4' is before an end moment of the signal-inputting time period (i.e., the sixth time period t6' in FIG. 8) of the gate control signal of the sub-pixels in the second row.

In some embodiments, referring to FIG. 8, an end moment of the first time period t1' is before the start moment of the signal-inputting time period (i.e., the fifth time period t5' in FIG. 8) of the gate control signal of the sub-pixels in the first row. A start moment of the second time period t2' is before the start moment of the signal-inputting time period (i.e., the fifth time period t5' in FIG. 8) of the gate control signal of the sub-pixels in the first row. An end moment of the third time period t3' is before the start moment of the signal-inputting time period (i.e., the sixth time period t6' in FIG. 8) of the gate control signal of the sub-pixels in the second row. A start moment of the fourth time period t4' is before the start moment of the signal-inputting time period (i.e., the sixth time period t6' in FIG. 8) of the gate control signal of the sub-pixels in the second row.

In some embodiments, referring to FIG. 8, the end moment of the signal-inputting time period (i.e., the fifth time period t5' in FIG. 8) of the gate control signal of the sub-pixels in the first row is before a start moment of a next first time period t1'. The end moment of the signal-inputting time period (i.e., the sixth time period t6' in FIG. 8) of the gate control signal of the sub-pixels in the second row is before a start moment of a next third time period t3'.

In some examples, referring to FIGS. 4 and 8, the gating devices 114 are P-type transistors. In the first time period t1' (the duration of which is d in FIG. 8), the gating signal MUX1 is at a low level. After receiving the gating signal MUX1, the first gating branch 110 electrically connects the data signal sub-terminal Data1 and the data signal sub-terminal Data2 to corresponding first data lines 103 that are connected to sub-pixels located in odd-numbered rows and odd-numbered columns respectively, so that the first data signal is written into a corresponding first data line 103 (a first data line 103 connected to sub-pixels located in the first column and the odd-numbered rows in FIG. 4) to be stored, and the second data signal is written into a corresponding first data line 103 (a first data line 103 connected to sub-pixels located in the third column and the odd-numbered rows in FIG. 4) to be stored.

Referring to FIGS. 4 and 8, in the second time period t2' (the duration of which is e in FIG. 8) after t1', the gating signal MUX1 is at a low level, and the gating signal MUX2 is at a high level. After receiving the gating signal MUX2, the second gating branch 111 electrically connects the data signal sub-terminal Data1 and the data signal sub-terminal Data2 to corresponding first data lines 103 that are connected to sub-pixels located in odd-numbered rows and even-numbered columns respectively, so that the first data signal is written into a corresponding first data line 103 (a first data line 103 connected to sub-pixels located in the second column and the odd-numbered rows in FIG. 4) to be stored, and the second data signal is written into a corresponding first data line 103 (a first data line 103 connected to sub-pixels located in the fourth column and the odd-numbered rows in FIG. 4) to be stored.

Referring to FIGS. 4 and 8, in the third time period t3' (the duration of which is d in FIG. 8) after the second time period t2', the gating signal MUX1 and the gating signal MUX2 are both at a high level, and the gating signal MUX3 is at a low level. After receiving the gating signal MUX3, the third gating branch 112 electrically connects the terminal Data1 and the terminal Data2 to corresponding second data lines 104 that are connected to sub-pixels located in even-numbered rows and odd-numbered columns respectively, so that the first data signal is written into a corresponding second data line 104 (a second data line 104 connected to sub-pixels located in the first column and the even-numbered rows in FIG. 4) to be stored, and the second data signal is written into a corresponding second data line 104 (a second data line 104 connected to the sub-pixels located in the third column and the even-numbered rows in FIG. 4) to be stored.

Referring to FIGS. 4 and 8, in the fourth time period t4' (the duration of which is e in FIG. 8) after the third time period t3', the gating signals from MUX1 to MUX3 are all at a high level, and the gating signal MUX4 is at a low level. After receiving the gating signal MUX4, the fourth gating branch 113 electrically connects the data signal sub-terminal Data1 and the data signal sub-terminal Data2 to corresponding second data lines 104 that are connected to sub-pixels located in even-numbered rows and even-numbered columns respectively, so that the first data signal is written into a corresponding second data line 104 (a second data line 104 connected to sub-pixels located in the second column and the even-numbered rows in FIG. 4) to be stored, and the second data signal is written into a corresponding second data line 104 (a second data line 104 connected to sub-pixels located in the fourth column and the even-numbered rows in FIG. 4) to be stored.

Referring to FIGS. 4 and 8, in the fifth time period t5' (the duration of which is h in FIG. 8) after the first time period t1', the gate control signal Gate1 output by the gate driving circuit R/G GOA_O of the first row is at a low level. As a result, the pixel circuits in the sub-pixels in the first row are turned on, and the first data lines 103 connected to the sub-pixels in the first row write the stored first data signal into the sub-pixel located in the first row and the first column and the sub-pixel located in the first row and the second column, and write the stored second data signal into the sub-pixel located in the first row and the third column and the sub-pixel located in the first row and the fourth column. The same principle applies to the writing of signals into sub-pixels located in other columns and the first row, so that the data writing and the Vth compensation of the sub-pixels in the first row may be completed in the fifth time period t5'.

Referring to FIGS. 4 and 8, in the sixth time period t6' (which partially overlaps with the fifth time period t5') after the third time period t3', the gate control signal Gate2 output by the gate driving circuit R/G GOA_E of the second row is at a low level. As a result, the pixel circuits in the sub-pixels in the second row are turned on, and the second data lines 104 connected to the sub-pixels in the second row write the stored first data signal into the sub-pixel located in the second row and the first column and the sub-pixel located in the second row and the second column, and write the stored second data signal into the sub-pixel located in the second row and the third column and the sub-pixel located in the second row and the fourth column. The same principle applies to the writing of signals into sub-pixels located in other columns and the second row, so that the data writing and the Vth compensation of the sub-pixels in the second row may be completed in the sixth time period t6'.

Referring to FIGS. 4 and 8, in the seventh time period t7' (which partially overlaps with the sixth time period t6') after the fourth time period t4', the gate control signal Gate3 output by the gate driving circuit R/G GOA_O of third row is at a low level. As a result, the pixel circuits in the sub-pixels in the third row are turned on, and the first data lines 103 connected to the sub-pixels of the third row write the stored first data signal into the sub-pixel located in the third row and the first column and the sub-pixel located in the third row and the second column, and write the stored second data signal into the sub-pixel located in the third row and the third column and the sub-pixel located in the third row and the fourth column. The same principle applies to the writing of signals into sub-pixels located in other columns and the third row, so that the data writing and the Vth compensation of the sub-pixels in the third row may be completed in the seventh time period t7'.

Referring to FIGS. 4 and 8, in the eighth time period t8' (which partially overlaps with the seventh time period t7'), the gate control signal Gate4 output by the gate driving circuit R/G GOA_E of the fourth row is at a low level. As a result, the pixel circuits in the sub-pixels in the fourth row are turned on, and the first data lines 103 connected to the sub-pixels in the fourth row write the stored first data signal into the sub-pixel located in the fourth row and the first column and the sub-pixel located in the fourth row and the second column, and write the stored second data signal into the sub-pixel located in the fourth row and the third column and the sub-pixel located in the fourth row and the fourth column. The same principle applies to the writing of signals into sub-pixels located in other columns and the fourth row, so that the data writing and the Vth compensation of sub-pixels in the fourth row may be completed in the eighth time period t8'.

As can be seen from FIG. 8, there is an overlap between any two adjacent time periods from t5' to t8'. Therefore, the data writing and the Vth compensation of the sub-pixels in a next row has already started when the data writing and the Vth compensation of the sub-pixels in a current row are still in progress, and there is no need to wait until the data writing and the Vth compensation of the sub-pixels in the current row to end to start the data writing and the Vth compensation of the sub-pixels in the next row. As a result, the data writing time and the Vth compensation time of the sub-pixels in the first row may be prolonged.

In some examples, referring to FIGS. 8, d, e, f, g, h, i and H' in FIG. 8 all represent time durations.

d represents acting durations of the data signals input to the first gating branch 110 and the third gating branch 112.

e represents acting durations of the data signals input to the second gating branch 111 and the fourth gating branch 113.

f represents a time difference between a start moment of a data signal-inputting time period of the first gating branch 110 and a start moment of a data signal-inputting time period of the second gating branch 111 in a same cycle (or, a time difference between a start moment of a data signal-inputting time period of the third gating branch 112 and a start moment of a data signal-inputting time period of the fourth gating branch 113 in a same cycle).

g represents a time difference between the start moment of the data signal-inputting time period of the first gating branch 110 and a start moment of an inputting time period of the corresponding gate control signal Gate1 of the first row or the corresponding gate control signal Gate3 of the third row (or, a time difference between the start moment of the data signal-inputting time period of the third gating branch 112 and a start moment of an inputting time period of the corresponding gate control signal Gate2 of the second row or the corresponding gate control signal Gate4 of the fourth row).

H' represents a row cycle of the data signals Data1 and Data2.

In some examples, the relationship between the magnitudes and quantities of the time durations are as shown in FIG. 8.

"f>d" means that: the end moment of the first time period t1' is before the start moment of the second time period t2', and the end moment of the third time period t3 is before the start moment of the fourth time period t4'.

"g>f" means that: the start moment of the second time period t2' is before the start moment of the signal-inputting time period of the gate control signal of the sub-pixels in the first row (i.e., the fifth time period t5'); and the start moment of the fourth time period t4' is before the start moment of the signal-inputting time period of the gate control signal of the sub-pixels in the second row (i.e., the sixth time period t6').

From "f>d" and "g>f", it may be obtained that "g>d", which means that: the end moment of the first time period t1' is before the start moment of the signal-inputting time period of the gate control signal of the sub-pixels in the first row (i.e., the fifth time period t5'); and the end moment of the third time period t3 is before the start moment of the signal-inputting time period of the gate control signal of the sub-pixels in the second row (i.e., the sixth time period t6').

"h=2H−g−i" means that: the end moment of the signal-inputting time period of the gate control signal of the sub-pixels in the first row (i.e., the fifth time period t5') is before a start moment of a next first time period t1'; and the end moment of the signal-inputting time period of the gate control signal of the sub-pixels in the second row (i.e., the sixth time period t6') is before a start moment of a next third time period t3'.

FIG. 8 only shows a timing diagram of acting time periods of gate control signals of rows in one cycle. It will be understood that the gate control signals of the rows are also input into the rows in sequence according to a specific cycle.

The above examples describe the driving principle of the sub-pixels in the first four rows in the sub-pixel array. The driving principle of the following rows are the same as that of the first four rows as shown in FIGS. 4 and 8, and details will not repeated here.

It is worth noting that, the embodiments of the present disclosure may at least achieve the following beneficial effects.

In some embodiments, based on different data lines (the first data lines and the second data lines) that are respectively connected to the sub-pixels located in odd-numbered rows and the sub-pixel units located in even-numbered rows, and are connected to the time-division multiplexing circuit, it may be possible to write the data signals of the data signal terminal into the data lines in a time-division manner. And based on the pixel control circuit in the display panel, it may be possible to control the pixel circuits in different rows of sub-pixels to be turned on in a time-division manner, so as to write the data signals already written into the data lines into the sub-pixels connected to the data lines in a time-division manner, and thus realize the Vth compensation of the sub-pixels in a time-division manner. By arranging the signal-inputting time periods of the gate control signals to overlap when the data writing of adjacent two rows of sub-pixels is performed in a time-division manner, it may be possible to extend the compensation time of each sub-pixel. In this way, the Vth compensation capability of each sub-pixel may be improved, the problem of uneven display of the display panel may be improved, and the display effect of the display panel at a high refresh rate may be enhanced.

In some embodiments, when the data signals are written into the data lines, the time-division multiplexing circuit may be used to electrically connect the data signal terminal to the first data lines and the second data lines in a time-division manner, so as to achieve the data writing of the first data lines and the second data lines in a time-division manner. Based on the time-division control function of the time-division multiplexing circuit, a relatively high refresh rate may be realized with a smaller number of IC channels, so that the number of IC channels may be effectively reduced when a high refresh rate is required. In some embodiments, one level of gating branches (including two gating branches) may be used to realize the data writing of data lines connected to sub-pixels located in different columns and a same row; in this scenario, the number of IC channels may be reduced by half. In some other embodiments, two levels of gating branches (i.e., four gating branches) may be used to realize the date writing of data lines connected to sub-pixels located in different columns and a same row; and in this scenario, the number of IC channels may be further reduced by half.

In some embodiments, based on the cooperation of the time-division multiplexing circuit and the gate driving circuits, it may be possible to start or complete the writing of the data signals into the data lines (the first data lines and the second data lines) connected to sub-pixels in each row before the sub-pixels in the row receive the gate control signal. In this way, when the sub-pixels in each row receive the gate control signal, it may be possible to quickly write the data signals from the data lines into the sub-pixels in the row connected to the data lines, and thus increase the data writing speed.

The foregoing descriptions are merely specific implementations of the present disclosure, but the protection scope of the present disclosure is not limited thereto. Any changes or replacements that a person skilled in the art could readily conceive of within the technical scope of the present disclosure shall be included in the protection scope of the present disclosure. Therefore, the protection scope of the present disclosure shall be subject to the protection scope of the claims.

What is claimed is:

1. A display panel, comprising: a sub-pixel array, a plurality of gate lines, a plurality of first data lines, a plurality of second data lines, a pixel control circuit and a time-division multiplexing circuit, wherein the sub-pixel array includes a plurality of sub-pixels arranged in a plurality of rows and a plurality of columns;

sub-pixels in a same row are coupled to the pixel control circuit through at least one gate line;

sub-pixels located in odd-numbered rows in sub-pixels in a same column are coupled to a first data line, and sub-pixels located in even-numbered rows in the sub-pixels in the same column are coupled to a second data line;

the time-division multiplexing circuit is coupled to the plurality of first data lines, the plurality of second data lines, and a data signal terminal;

the time-division multiplexing circuit is configured to electrically connect the data signal terminal to the first data lines and the second data lines in a time-division manner, so as to input data signals output by the data signal terminal to the first data lines and the second data lines in a time-division manner;

the pixel control circuit is configured to input gate control signals to all rows of sub-pixels in a time-division manner, so as to turn on pixel circuits in the rows of sub-pixels, wherein signal-inputting time periods in which the gate control signals are input to any adjacent two rows of sub-pixels partially overlap;

the first data lines and the second data lines are configured to input the data signals to the rows of sub-pixels in a time-division manner according to on/off states of the pixel circuits in the rows of sub-pixels; and the time-division multiplexing circuit includes:

at least two gating branches, a first end of a gating branch being coupled to the data signal terminal, and a second end of the gating branch being coupled to at least one first data line or at least one second data line, wherein all the gating branches are configured to be turned on in different time periods, and on-state time periods of all the gating branches are arranged in sequence and do not overlap with each other;

the at least two gating branches include a first gating branch, a second gating branch, a third gating branch and a fourth gating branch;

a first end of the first gating branch is coupled to the data signal terminal, and a second end of the first gating branch is coupled to all first data lines coupled to sub-pixels located in odd-numbered columns; the first gating branch is configured to electrically connect the data signal terminal to all the first data lines coupled to the sub-pixels located in the odd-numbered columns in a first time period;

a first end of the second gating branch is coupled to the data signal terminal, and a second end of the second gating branch is coupled to all first data lines coupled to sub-pixels located in even-numbered columns; the second gating branch is configured to electrically connect the data signal terminal to all the first data lines coupled to the sub-pixels located in the even-numbered columns in a second time period;

a first end of the third gating branch is coupled to the data signal terminal, and a second end of the third gating branch is coupled to all second data lines coupled to another sub-pixels located in the odd-numbered columns; the third gating branch is configured to electrically connect the data signal terminal to all the second data lines coupled to the another sub-pixels located in the odd-numbered columns in a third time period; and a first end of the fourth gating branch is coupled to the data signal terminal, and a second end of the fourth gating branch is coupled to all second data lines coupled to another sub-pixels located in the even-numbered columns; the fourth gating branch is configured to electrically connect the data signal terminal to all the second data lines coupled to the another sub-pixels located in the even-numbered columns in a fourth time period, wherein the first time period, the second time period, the third time period and the fourth time period are arranged in sequence and do not overlap with each other; and the duration of the first time period is equal to the duration of the third time period, the duration of the second time period is equal to the duration of the fourth time period, the duration of the first time period and the duration of the third time period are less than the duration of the second time period and the duration of the fourth time period.

2. The display panel according to claim 1, wherein the data signal terminal includes a plurality of data signal sub-terminals, and a data signal sub-terminal is coupled to a data line, of all data lines, connected to each gating branch.

3. The display panel according to claim 1, wherein a first data line connected to sub-pixels in each column is located on a first side of the sub-pixels in the column, and a second data line connected to another sub-pixels in the column is located on a second side of the another sub-pixels in the column.

4. The display panel according to claim 1, wherein a first data line connected to sub-pixels in an odd-numbered column is located on a first side of the sub-pixels in the odd-numbered column, and a second data line connected to another sub-pixels in the odd-numbered column is located on a second side of the another sub-pixels in the odd-numbered column;

a first data line connected to sub-pixels in an even-numbered column is located on a second side of the sub-pixels in the even-numbered column, and a second data line connected to another sub-pixels in the even-numbered column is located on a first side of the another sub-pixels in the even-numbered column.

5. A display device, comprising:

the display panel according to claim 1.

6. A method for driving a display panel, for use in driving the display panel according to claim 1, the method comprising:

electrically connecting, by the time-division multiplexing circuit, the data signal terminal to the first data lines and the second data lines in a time-division manner, so as to input the data signals output by the data signal terminal to the first data lines and the second data lines in a time-division manner;

inputting, by the pixel control circuit, the gate control signals to the all rows of sub-pixels in a time-division manner, so as to turn on the pixel circuits in the rows of sub-pixels, wherein the signal-inputting time periods in which the gate control signals are input to the any adjacent two rows of sub-pixels partially overlap; and inputting, by the first data lines and the second data lines, the data signals to the rows of sub-pixels in a time-division manner according to on/off states of the pixel circuits in the rows of sub-pixels; wherein the time-division multiplexing circuit includes at least two gating branches; and electrically connecting, by the time-division multiplexing circuit, the data signal terminal to the first data lines and the second data lines in a time-division manner, so as to input the data signals output by the data signal terminal to the first data lines and the second data lines in a time-division manner, includes:

controlling different gating branches to be turned on in different time periods, on-state time periods of all gating branches being arranged in sequence and not overlapping with each other; wherein the at least two gating branches include a first gating branch, a second gating branch, a third gating branch and a fourth gating branch; and electrically connecting, by the time-division multiplexing circuit, the data signal terminal to the first data lines and the second data lines in a time-division manner, so as to input the data signals output by the data signal terminal to the first data lines and the second data lines in a time-division manner, includes:

in a first time period, electrically connecting, by the first gating branch, the data signal terminal to all first data lines coupled to sub-pixels located in odd-numbered columns, so as to input the data signals output by the data signal terminal to all the first data lines coupled to the sub-pixels located in the odd-numbered columns;

in a second time period, electrically connecting, by the second gating branch, the data signal terminal to all first data lines coupled to sub-pixels located in even-numbered columns, so as to input the data signals output by the data signal terminal to all the first data lines coupled to the sub-pixels located in the even-numbered columns;

in a third time period, electrically connecting, by the third gating branch, the data signal terminal to all second data lines coupled to another sub-pixels located in the odd-numbered columns, so as to input the data signals output by the data signal terminal to all the second data lines coupled to the another sub-pixels located in the odd-numbered columns; and in a fourth time period, electrically connecting, by the fourth gating branch, the data signal terminal to all second data lines coupled to another sub-pixels located in the even-numbered columns, so as to input the data signals output by the data signal terminal to all the second data lines coupled to the another sub-pixels located in the even-numbered columns, wherein the first time period, the second time period, the third time period and the fourth time period are arranged in sequence and do not overlap with each other; and the duration of the first time period is equal to the duration of the third time period, the duration of the second time period is equal to the duration of the fourth time period, the duration of the first time period and the duration of the third time period are less than the duration of the second time period and the duration of the fourth time period.

7. The method according to claim 6, wherein a start moment of a time period in which a data line connected to a sub-pixel is electrically connected to the data signal terminal, is before a start moment of a signal-inputting time period of a gate control signal of the sub-pixel;

an end moment of the time period in which the data line connected to the sub-pixel is electrically connected to the data signal terminal, is before an end moment of the signal-inputting time period of the gate control signal of the sub-pixel, wherein the data line is the first data line or the second data line.

8. The method according to claim 6, wherein a start moment of the first time period is before a start moment of a signal-inputting time period of a gate control signal of sub-pixels in a first row;

an end moment of the second time period is before an end moment of the signal-inputting time period of the gate control signal of the sub-pixels in the first row;

a start moment of the third time period is before a start moment of a signal-inputting time period of a gate control signal of sub-pixels in a second row; and an end moment of the fourth time period is before an end moment of the signal-inputting time period of the gate control signal of the sub-pixels in the second row.

9. The method according to claim 6, wherein an end moment of the first time period is before a start moment of a signal-inputting time period of a gate control signal of sub-pixels in a first row;

a start moment of the second time period is before the start moment of the signal-inputting time period of the gate control signal of the sub-pixels in the first row;

an end moment of the third time period is before a start moment of a signal-inputting time period of a gate control signal of sub-pixels in a second row; and a start moment of the fourth time period is before the start moment of the signal-inputting time period of the gate control signal of the sub-pixels in the second row.

10. The method according to claim 6, wherein an end moment of a signal-inputting time period of a gate control signal of sub-pixels in a first row is before a start moment of a next first time period; and an end moment of a signal-inputting time period of a gate control signal of sub-pixels in a second row is before a start moment of a next third time period.

11. The display panel according to claim 1, wherein each gating branch includes a plurality of gating devices, wherein a control terminal of each gating device is configured to receive a gating signal, a first terminal of the gating device is coupled to a corresponding first data line or second data line, and a second terminal of the gating device is coupled to the data signal terminal.

* * * * *